US007720566B1

(12) United States Patent
Di Troia et al.

(10) Patent No.: US 7,720,566 B1
(45) Date of Patent: May 18, 2010

(54) CONTROL ALGORITHM FOR VERTICAL PACKAGE CONVEYOR

(75) Inventors: Mark A. Di Troia, Mullica Hill, NJ (US); Adam L. Kirby, Fair Lawn, NJ (US); Suzanne D. Kralle, Runnemede, NJ (US); John Messick, Middletown, DE (US); John D. Cavalieri, Philadelphia, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1172 days.

(21) Appl. No.: 10/890,839

(22) Filed: Jul. 8, 2004

Related U.S. Application Data

(60) Provisional application No. 60/492,059, filed on Jul. 29, 2003.

(51) Int. Cl.
*G06F 7/00* (2006.01)
(52) U.S. Cl. .................................................... 700/230
(58) Field of Classification Search ................ 700/213, 700/230
See application file for complete search history.

(56) References Cited

U.S. PATENT DOCUMENTS

| 3,972,412 A | 8/1976 | Henkel |
| 4,020,953 A | 5/1977 | Eklof et al. |
| 4,219,301 A | 8/1980 | Freeman |
| 4,986,411 A | 1/1991 | Splitstoser et al. |
| 5,205,379 A | 4/1993 | Pfleger |
| 5,216,613 A * | 6/1993 | Head, III ..................... 700/102 |
| 5,320,471 A | 6/1994 | Grathoff |
| 5,350,050 A | 9/1994 | Franke |
| 5,601,178 A * | 2/1997 | Zaharia et al. .............. 198/323 |
| 5,718,322 A | 2/1998 | Mulhern |
| 5,886,497 A * | 3/1999 | Zaharia ...................... 318/779 |
| 6,039,168 A * | 3/2000 | Head, III ............... 198/341.07 |
| 6,059,521 A | 5/2000 | Rapell |
| 6,536,582 B1 | 3/2003 | Combs |
| 2002/0014392 A1 | 2/2002 | Grond |

* cited by examiner

*Primary Examiner*—Gene Crawford
*Assistant Examiner*—Ramya Prakasam
(74) *Attorney, Agent, or Firm*—Howard Kaiser

(57) ABSTRACT

Three software programs are respectively run on the main processing constituent of a programmable logic controller (PLC), the network-controlling constituent of the PLC, and a human interface unit. Intelligent (e.g., switch, sensor, control, etc.) devices are distributed within a communications network associated with a vertical package conveyor (VPC). Signals are transmitted between/among the processing constituent, the controlling constituent, the interface and the devices. In an ongoing informational and regulative process, the devices provide input for the processing constituent, which in turn provides output to the devices. In furtherance of human safety, the processing constituent causes VPC operation to stop upon the occurrence of any of the following events: breached light curtain; open machinery access door; inoperable run stop button; inoperable emergency stop button; activated emergency stop button; misplaced package. The processing constituent also dictates the direction (up or down) and mode (constant or variable) of the VPC.

20 Claims, 18 Drawing Sheets

| NAME OF ROUTINE | DESCRIPTION OF ROUTINE |
|---|---|
| MainRoutine | Runs the basic logic to actually run the conveyor and checks all conditions for safe operation. This routine also calls all other routines to determine the current state of the conveyor. |
| AmpSpikes_Weight Test | This routine saves Runtime Amp data if a spike occurs greater than Spike value within one half second (SpikeTime.PRE). Also prevents Inrush Current on start-up. |
| Auto_Oiler | Everything that pertains to running, monitoring, and displaying information about the automatic oiler is contained in this routine. |
| DefineMotorControl | Enables subroutines based on the motor control device that is installed. (E3/VFD). |
| DetermineConveyorType | Queries nodes 16, 21, 26, 31, and 36 to find the down overtravel and then sets the number of levels in the program accordingly. It then queries nodes 3 and 37 to determine the motor control device that is installed. |
| Door_Matrix | Calls Door Matrix Check and checks that there are two and only two doors open. |
| Door_Matrix_Check | Counts the number of open doors and assigns the first two open doors to variable names. Also makes sure that all closed doors also have their loader/unloader in the stow position. |

FIG. 5A

| NAME OF ROUTINE | DESCRIPTION OF ROUTINE |
|---|---|
| E3_Decrypt | This subroutine retrieves all relevant data from the E3 device using explicit messages and mapped I/O. |
| Emergency_Run_Mode | This subroutine allows the conveyor to be run regardless of safety conditions. All safety devices are bypassed. However, conveyor can only run for 25 seconds, which allows for approximately one trayspace of movement at 20% normal speed. After 15 minutes, conveyor will automatically return to normal operation. |
| GenLC | Receives data from Light Curtain Access and processes it into a reasonable format. Then returns processed information to Light Curtain Access. |
| Global_Access_PVMsg | This subroutine gathers all information that is relevant to more than one screen on the panelview and copies it all to a single tag. This tag will be sent to the panelview via an explicit message elsewhere in the program. |
| Horns | Determines which horns are to sound before the conveyor starts running depending on which two doors happen to be open at the time. |
| ICAS | All information that is to be provided to the ICAS system on the ship is sent through this routine. |
| Index_Change_State | If the conveyor is running and the index/continuous switch changes position, this immediately stops conveyor movement. |

FIG. 5B

| NAME OF ROUTINE | DESCRIPTION OF ROUTINE |
|---|---|
| Initialize_AO_Tmr_Preset | Sets the amount of time for the auto oiler to run based on the length of the carrier chains. This decision is based on the number of levels that the conveyor serves. |
| Input_Map | Sets all of the inputs from the controller to a specific tag name. |
| Light Curtain_"X"_PVMsg | Collects all information from the light curtain system on each level. (Where "X" represents any level number) After collecting this data, it stores it all in an array which is later sent to the panelview for display purposes. |
| Light Curtain_Access | Sends specific data to GenLC to be processed and returned to various variable names. |
| Light_Curtain_Check | This will check to see if any of the light curtains have been breached at a time when it was not muted and for any light curtain system errors. It then records the error number. |
| Light_Curtain_Decrypt | Calls Light Curtain Access and moves data received from Light Curtain Access into more intuitive variable names. |

FIG. 5C

| NAME OF ROUTINE | DESCRIPTION OF ROUTINE |
|---|---|
| Move_Blank_Change | This subroutine is called whenever the runtime is changed at the panelview. The "Runtime_Changes" tag is a log of the last 10 times the runtime was changed. It keeps track of the month and year of the change and the new number that the runtime was changed to. This subroutine moves all log entries up one position to make room for the new entry. |
| Move_Blank_Log | This subroutine is called at the end of every month. It serves the same purpose as the "Move_Blank_Change" subroutine except it applies to the "Month_Time" tag. This tag logs the month number and year of the month that just ended and the amount of time the conveyor was running during that month. |
| Network_Status_Routine | This routine watches for network errors through the Devicenet scanner. Errors found in this subroutine are sent to the panelview later in the program. |
| Output_Map | Sets all of the outputs at the controller to a specific tag name. |
| Panelview_Main | Depending on the screen that the panelview is currently displaying, this subroutine will call another subroutine that contains all of the input/output data associated with that screen. This subroutine calls all other subroutines that have to do with passing data back and forth between the PLC and the panelview. |

FIG. 5D

| NAME OF ROUTINE | DESCRIPTION OF ROUTINE |
| --- | --- |
| PV_DisplayInfo | Determines what part information is displayed in the blue boxes on the panelview. Blue boxes occur on several different screens. Part information usually contains the part name, the part number, and contact information needed to purchase it. |
| PV_ScreenControl | Reads screen change requests from the panelview and determines whether or not it is a valid request. If it is valid, it then inserts a blank screen to the panelview for 0.5 seconds. This is to allow for the new screen information to be sent before the screen itself is displayed. After the 0.5 second delay, the previously requested screen number is sent to the panelview and the screen changes. |
| PV ScrnXXXXXXXXX | This subroutine is called by "Panelview_Main". Controls all input/output data between the PLC and the panelview that is associated with that screen while that screen is being displayed. |
| PV_Send_PVMsg | Gathers all data to be sent to the panelview via explicit messages and sends it all at once. |
| Runtime_By_Month | At the beginning of each month, the runtime of the conveyor from the beginning of the previous month is subtracted from the current runtime. The difference is the amount of runtime that occurred during that month. This number, along with the month number and the year are recorded in a tag named "Month_Time". |

FIG. 5E

| NAME OF ROUTINE | DESCRIPTION OF ROUTINE |
| --- | --- |
| Runtime_DownCont | This subroutine records the amount of time that the conveyor has actually been running in down continuous mode. |
| Runtime_Hardware | This subroutine records the amount of time that the mechanical parts of the conveyor have actually been moving, NOT uptime of the system. |
| Runtime_UpCont | This subroutine records the amount of time that the conveyor has actually been running in up continuous mode. |
| Runtime_UpIndex | This subroutine records the amount of time that the conveyor has actually been running in up index mode. |
| Unconditional_Faults | This routine addresses all safety concerns and stops the conveyor immediately if any of these conditions are met. |
| Up_Overtravel | When the PLC receives an input from the up overtravel device, it starts a timer for a user determined length of time. If the up overtravel device is still sending a signal when the timer is done counting, the up overtravel condition is sent to the rest of the program. |
| VFD_Control | This routine sets all the parameters within the variable frequency drive and makes sure that it meets certain conditions for the drive to run properly. |

FIG. 5F

| NAME OF ROUTINE | DESCRIPTION OF ROUTINE |
| --- | --- |
| VFD_Decrypt | Processes information taken from the variable frequency drive and returns that information in a usable format. |
| Over_Routine | This routine calls the Electronic Overload routine and resets all amp values whenever the conveyor stops moving. |
| E3_OverRoutine | Every time the motor shuts down this subroutine will reset all of the amperage values to zero. Once the motor turns on again, the "Electronic_Overload" subroutine is called. |
| Electronic_Overload | This routine runs at a specified time interval and monitors the current from the motor. If the conveyor gets stuck or jammed and does not cause a fault in the main program, the current from the motor will change drastically which can cause damage to the motor and the conveyor itself, while putting lives in danger. This will shut down the conveyor if this happens. |
| VFD_OverRoutine | Every time the motor shuts down this subroutine will reset all of the amperage values to zero. Once the motor turns on again, there is a one second delay before the "Electronic_Overload" subroutine is called. This delay is to allow the amperage values to stabilize after the initial movement of the conveyor. |

FIG. 5G

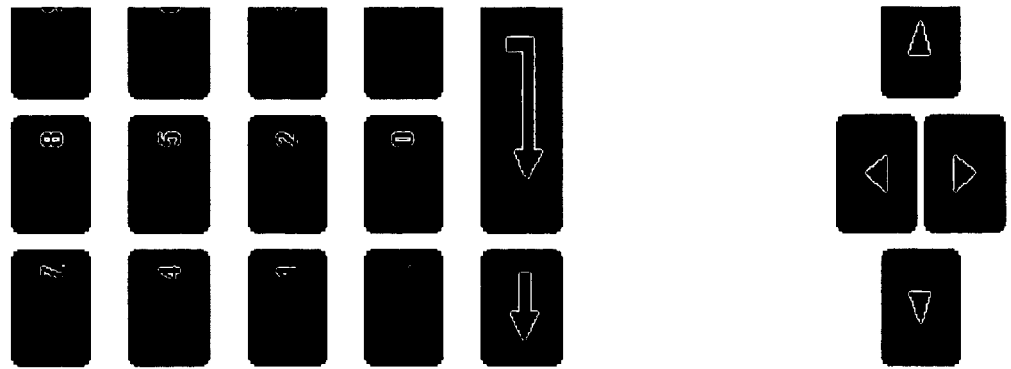
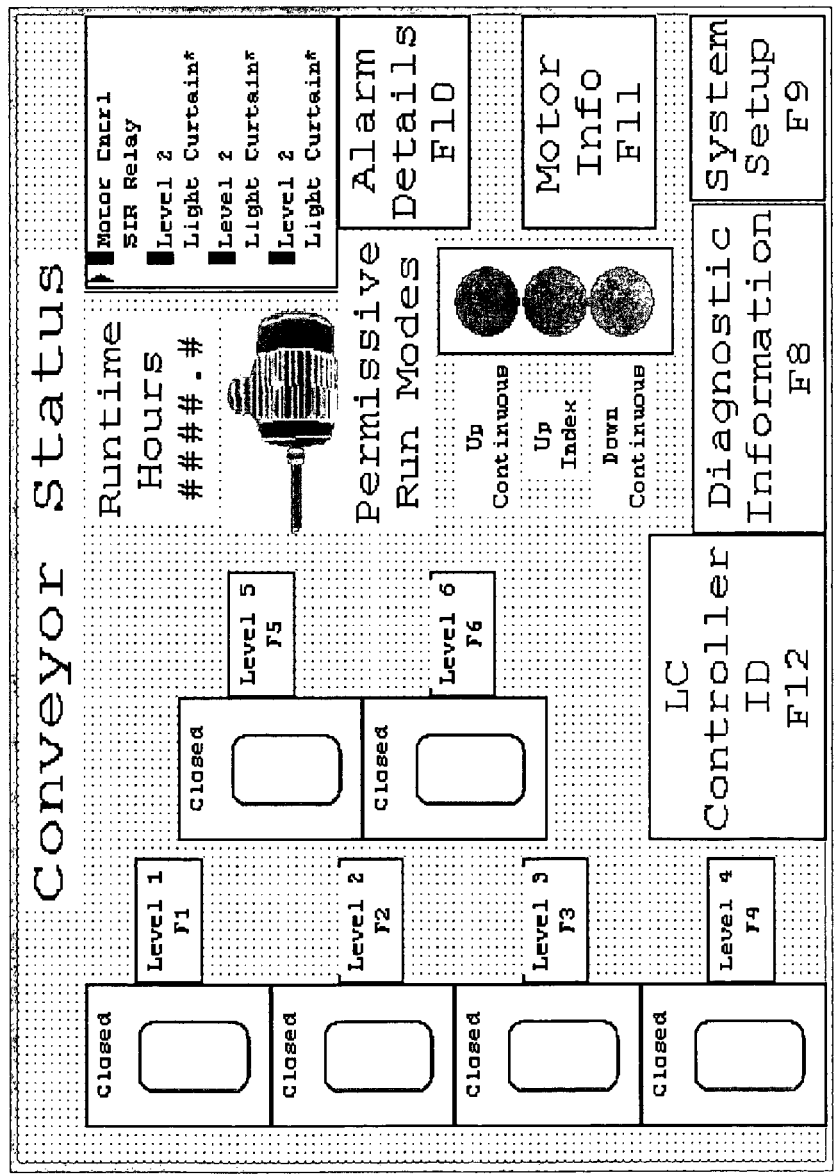
FIG. 6

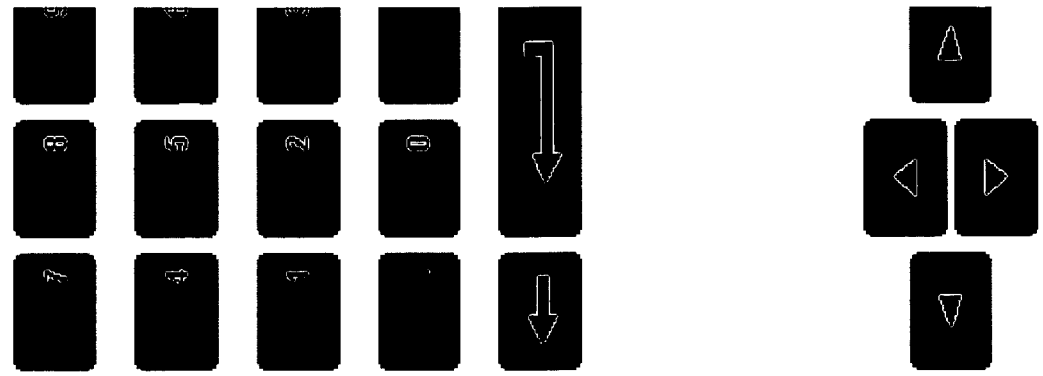
FIG. 11
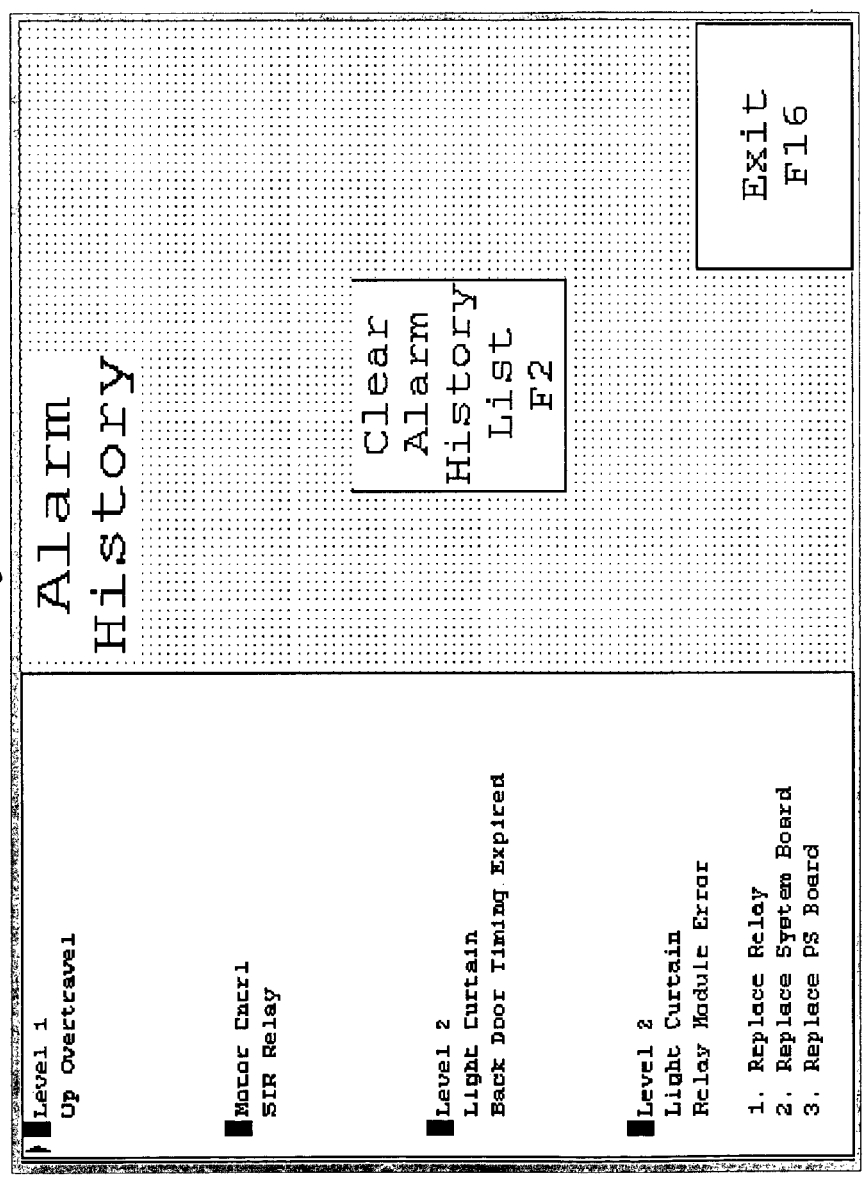

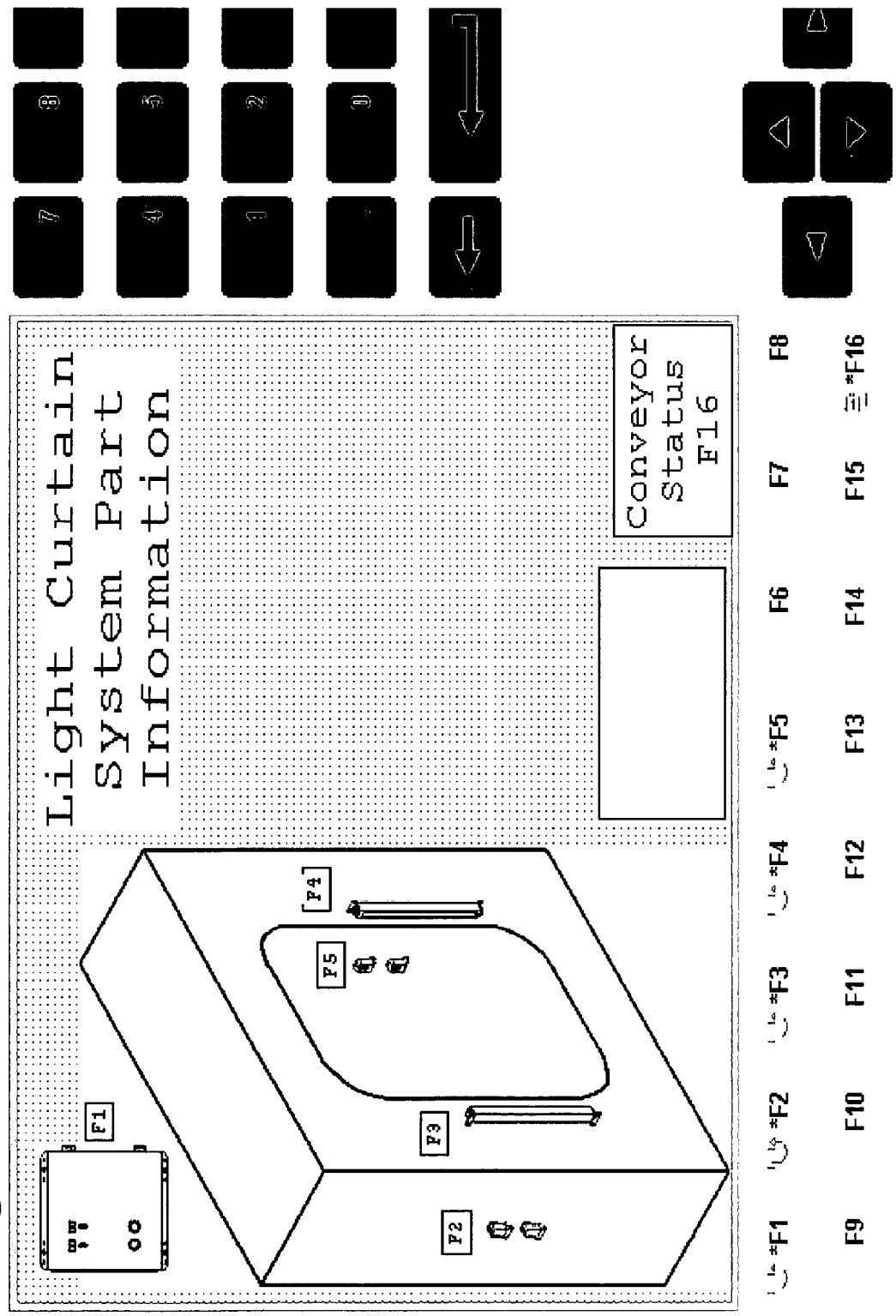

CONTROL ALGORITHM FOR VERTICAL PACKAGE CONVEYOR

CROSS-REFERENCE TO RELATED APPLICATIONS

This application claims the benefit of U.S. Provisional Application No. 60/492,059, filed 29 Jul. 2003, entitled "Control Algorithm for Vertical Package Conveyor," incorporated herein by reference.

STATEMENT OF GOVERNMENT INTEREST

The invention described herein may be manufactured and used by or for the Government of the United States of America for governmental purposes without the payment of any royalties thereon or therefor.

BRIEF DESCRIPTION OF THE COMPUTER PROGRAM LISTING APPENDIX

Incorporated herein by reference is a computer program listing appendix setting forth inventive embodiments of computer source code. This computer program listing appendix is contained as four documents that were created on 19 Apr. 2004 in a CD-R compact disc that is now situated in the application file. The CD-R compact disc contains three data files in ASCII text file format, entitled "conveyormainprocessorcode.txt" (about 191 KB), "conveyornetworkcontrollercode.txt" (about 62.3 KB), and "conveyorinterfaceunitcode.txt" (about 1.16 MB). The CD-R compact disc also contains one data file in Microsoft Word file format, entitled "conveyorinterfaceunitcode(pictorial).doc" (about 669 KB). The file entitled "conveyormainprocessorcode" pertains to the present invention's "main processor." The file entitled "conveyornetworkcontrollercode" pertains to the present invention's "network controller." The files entitled "conveyorinterfaceunitcode" and "conveyorinterfaceunitcode(pictorial).doc" each pertain to the present invention's "interface unit."

BACKGROUND OF THE INVENTION

The present invention relates to the conveyance or transportation of objects, more particularly to methods and apparatuses for controlling or regulating the operation of devices such as vertical package conveyors.

A "vertical package conveyor" ("VPC") is a conveyance apparatus typically of a kind that includes one or more (usually, many) horizontal tray components that are physically attached to a movable chain, wherein the chain moves vertically, often on a continual basis, so as to transport bulk materials and other packages from one location (e.g., level or floor) to another. Due to their complexity and dynamism, VPCs are intrinsically dangerous, maintenance-intensive and difficult to troubleshoot.

Vertical package conveyors are used aboard some United States Navy ships. According to current Navy practice, vertical package conveyors are associated with a relay controller. A relay type of controller limits the ability to introduce new technology and intelligent sensors to a vertical package conveyance system. A system implementing a relay controller is incapable of being connected to any type of network. Some of the existing electrical components require periodic adjustments to ensure that the system remains reliable and safe. If these adjustments drift or for some reason vary, the conveyor could then have major failures and possibly become unsafe.

The U.S. Navy has customarily predicated its ship maintenance systems on time-directed preventive maintenance principles. Recently, the U.S. Navy has been transitioning in favor of "condition-based maintenance" ("CBM") principles, with a view toward increasing readiness, decreasing maintenance and decreasing manning requirements. Generally, the objective of the U.S. Navy's transformation from time-directed preventive maintenance to condition-directed maintenance is to optimize readiness while reducing maintenance and manning requirements. The underlying concept of condition-based maintenance (synonymously referred to as "condition-directed maintenance") is that the utilization of sensors, algorithms and automated reasoning and decision-making models to monitor equipment operations will provide critical analyses to operators that will help prevent impending failure. "Red flags" will appear to operators so that maintenance efforts can focus limited resources on areas most needed to ensure safety and mission readiness, while at the same time minimizing operating costs, labor and risk of mission-degrading failure. It is anticipated that, at optimal capacity, the U.S. Navy's CBM technology will: detect and classify impending failures; predict the remaining life cycle of equipment; interface with the control system to take action; provide support in performing corrective maintenance; provide data to life cycle management activities; and, update logistics support system. The expectation is that significant improvements in safety, reliability and affordability will ensue.

A "programmable logic controller" ("PLC") is a specialized computer device, typically of rugged construction, that reads input signals, runs control logic, and writes output signals. PLCs have been used in industry for over thirty years for effecting "automation" such as involving the exercise of control of a system of machinery in a manner involving the turning on or off of outputs, based on a state of inputs. Typically used for monitoring important process parameters and adjusting process operations accordingly, a PLC is suitable for assembling and concentrating voluminous data (e.g., status information) that is uploaded therein in a compact form. In earlier times, electrical control was based on relays that allowed power to be switched on and off without a mechanical switch. Relays are still used to make simple logical control decisions, but PLCs are more commonly used for effecting more complicated controls. Programmable logic control typically represents a computerized version of a relay control system that can be used to control manufacturing and other systems. The programming is usually performed using "ladder logic," involving the setting up, inter-linking and timing of sequences in a manner mimicking relay logic.

A relay type of vertical package conveyance control system does not lend itself to incorporation of the CBM philosophy recently instituted by the Navy. Some repairs have resulted in inordinate costs due to the failure of this relay-type control system to identify the degrading conditions of components. It would be desirable to practice a vertical package conveyance methodology that is consistent with CBM values.

The following U.S. patent documents, incorporated herein by reference, are pertinent to vertical package conveyors: Combs U.S. Pat. No. 6,536,582 issued 25 Mar. 2003; Grond U.S. Patent Application Publication 2002/0014392 A1 published 7 Feb. 2002; Rapell U.S. Pat. No. 6,059,521 issued 9 May 2000; Mulhern U.S. Pat. No. 5,718,322 issued 17 Feb. 1998; Grathoff U.S. Pat. No. 5,320,471 issued 14 Jun. 1994; Franke U.S. Pat. No. 5,350,050 issued 27 Sep. 1994; Pfleger U.S. Pat. No. 5,205,379 issued 27 Apr. 1993; Splitstoser et al. U.S. Pat. No. 4,986,411 issued Jan. 22, 1991; Freeman U.S. Pat. No. 4,219,301 issued 26 Aug. 1980; Eklof et al. U.S. Pat.

No. 4,020,953 issued 3 May 1977; Henkel U.S. Pat. No. 3,972,412 issued 3 Aug. 1976.

SUMMARY OF THE INVENTION

In view of the foregoing, it is an object of the present invention to provide method, system and algorithm for effecting vertical package conveyance in a safe, reliable, efficient and economical manner.

It is another object of the present invention to provide method, system and algorithm for effecting vertical package conveyance in a manner compatible with and in furtherance of "condition-directed" principles and practices.

In accordance with typical embodiments of the present invention, the inventive system is for use in association with conveyor apparatus such as a vertical package conveyor. The inventive system comprises means for controlling the operation of said conveyor apparatus. The controlling of the operation of the conveyor apparatus includes: monitoring whether an unsafe condition exists in the operation of the conveyor apparatus; and, ceasing the operation of the conveyor apparatus upon determining that an unsafe condition exists in the operation of the conveyor apparatus. According usual inventive practice, the controlling of the operation of the conveyor apparatus further includes, after the ceasing of the operation of the conveyor apparatus, at least one of the following: correcting the unsafe condition that exists; and/or re-initiating the operation of the conveyor apparatus. Inventive practice can be concerned not only with operational safety issues but also with standard operational issues. According to many such embodiments, the controlling of the operation of the conveyor apparatus further includes establishing at least one of the following: the direction, in terms of upward versus downward, of the operation of said conveyor apparatus; and/or, the mode, in terms of variability versus invariability of speed, of the operation of said conveyor apparatus.

A typical embodiment of an inventive method for controlling a vertical package conveyor comprises regulating the safety condition of said vertical package conveyor. The regulating includes: seeking an unsafe condition associated with the vertical package conveyor; and, causing the vertical package conveyor to stop functioning upon the finding of an unsafe condition. Usually, the inventive method further comprises: connecting a plurality of intelligent devices to the vertical package conveyor; and, connecting a programmable logic controller to the intelligent devices. The regulating of the safety condition of the vertical package conveyor includes inputting from the intelligent devices to the programmable logic controller and outputting from the programmable logic controller to the intelligent devices. Typically, a computer program product is installed in the programmable logic controller so as to provide instructions relating to the regulating of the safety condition of the vertical package conveyor. Normally, an interface unit is connected to the programmable logic controller; one or more persons interact with the programmable logic controller via the interface unit. The regulating of the safety condition usually further includes the elimination of the unsafe condition (e.g., via human intervention) subsequent to the stoppage of functioning of the vertical package conveyor, and the resumption of functioning of the vertical package conveyor subsequent to the elimination of the unsafe condition.

A typical embodiment of an inventive computer program product comprises a computer useable medium having computer program logic recorded thereon for enabling a computer to control the operation of a vertical package conveyor. The computer program logic comprises: means for enabling the computer to track at least one safety indicia pertaining to the operation of the vertical package conveyor; and, means for enabling the computer to stop the operation of the vertical package conveyor upon the occurrence of at least one unsafe event. According to usual inventive practice, the means for enabling the computer to track includes means for enabling the computer to observe at least one unsafe event selected from the group consisting of a light curtain breach, an open machinery access door, a stoppage malfunction and a package misplacement. Frequently, the computer program logic further comprises at least one of the following means: means for enabling the computer to govern up-versus-down direction of the operation of the vertical package conveyor; and/or, means for enabling the computer to govern variable-versus-invariable speed of the operation of the vertical package conveyor.

The present invention provides an algorithm that, according to typical inventive practice, is used in association with a vertical package conveyor such as those employed aboard US Navy ships. The inventive algorithm exercises control, provides status and condition assessment, and provides troubleshooting information, relative to the vertical package conveyor with which it is associated. The inventive algorithm is a program/code that can be used in conjunction with a processor-controller such as a programmable logic controller (PLC). According to some embodiments, the present invention's algorithmic system is additionally designed to collect many different data points that can be used for trending and advancing condition-based maintenance (CBM). In furtherance of the condition-based maintenance goals increasingly gaining U.S. Navy emphasis, the present invention is expected to play an important role for the U.S. Navy in terms of providing automated reasoning and decision-making models for data-tracking involving the vertical conveyance of packages.

As typically embodied, the present invention's algorithm provides, for vertical package conveyors (VPCs), decision-making as well as information and guidance pertaining to status, troubleshooting and CBM. Associated with a particular VPC, the inventive algorithm receives inputs via discrete input connections and through a network so as to determine the states and conditions of intelligent devices including switches, photo sensors, ultrasonic sensors and distributed input/output (control) modules. The inventive algorithm uses these inputs to determine what type of operation can be performed by the individual vertical package conveyor system with which the inventive algorithm is associated. If the inventive algorithm determines that the VPC system cannot be operated as configured, that an unsafe condition exists, or that a failure has occurred, the inventive algorithm will then provide information and guidance to the cause of the problem and will even provide corrective actions.

The present invention replaces the customary relay-type control system with a network control system that includes a processor-controller (e.g., a programmable logic controller), a human-to-machine interface unit and various intelligent devices connected to several local networks. According to the present invention, various devices are installed in corresponding relationships with a VPC. These installed devices communicate directly with the "controller" constituent of the processor-controller. Various parameters are monitored by the inventive network control system on an ongoing basis in a "ladder logic" manner. The inventive "ladder logic" control algorithm, resident in the memory of the "processor" aspect of the processor-controller, is not a "feedback loop" control algorithm, as such; nevertheless, the inventive "ladder logic" control is analogous to continuous feedback control in terms of monitorial continuity.

Typically, the inventive network control system, when installed in relation to a VPC system, provides condition assessment and operational regulation of the VPC system in terms of safety (e.g., regarding personal trespasses, open doors that should be closed, problems relating to run and emergency stops, jammed cargo placements), direction (e.g., whether the VPC moves up or down) and mode of operation (e.g., whether the VPC operates at constant speed versus variable speed). For instance, safety light curtains are installed at all lower levels to dramatically improve personnel safety. These safety curtain sensors and other types of intelligent devices allow for CBM effectuation.

The inventive use of PLCs enables the application of technology to the conveyors so as to increase reliability, decrease maintenance and troubleshooting time, and permit future expansion such as involving automation. Troubleshooting capabilities are inventively enhanced by the diagnostic potential of PLCs and intelligent devices (e.g., sensors, switches and controllers), and by fault analysis programming. System problems are more quickly and accurately assessed, and are therefore more expeditiously and effectively resolved.

In addition, the inventive implementation of a PLC eliminates all of the electrical single point failures that currently exist in relay-type control systems. Furthermore, the present invention features installation of a variable drive for motor control, which reduces the number of components needed and that affords greater protection, quicker response to over-current conditions, greater reliability, and monitoring capabilities that can be used for CBM. The present invention's utilization of a PLC and intelligent devices (e.g., sensors, switches, control modules) transforms a vertical package conveyor into an intelligent, networked system in and of itself.

Moreover, a typical U.S. Navy ship having vertical package conveyance capability is equipped with many vertical package conveyors. According to some inventive embodiments, not only is each conveyor "intra-networked" (networked within itself), but is also part of an "inter-networked" system. For instance, the conveyors can be networked with respect to a central monitoring system, and/or with respect to the ship's network. These kinds of "inter-networking" can allow fuller implementation of CBM and trending.

Further, the present invention allows for more varied use of conveyors. Conveyors can be used in various unprecedented ways (e.g., at mid levels, for conducting daily breakouts, for striking down of supplies, etc.) without the current need for large numbers of personnel as working parties. The elimination of the single point failures decreases downtime, thus increasing the ability of ship's force to run the conveyors more often and for longer durations. It is estimated that the present invention's new VPC control system, if adopted by the U.S. Navy and once installed thereby, will realize savings of over a million dollars, with a relatively short payback period (e.g., less than two years).

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 5A through FIG. 5G together constitute a table providing explanations of various routines of the PLC ladder logic shown in FIG. 4.

FIG. 6 through FIG. 12 are diagrammatic representations of various status, error and troubleshooting screens corresponding to the inventive prototypes shown in FIG. 2 and FIG. 4.

DETAILED DESCRIPTION OF THE INVENTION

Figure 1:
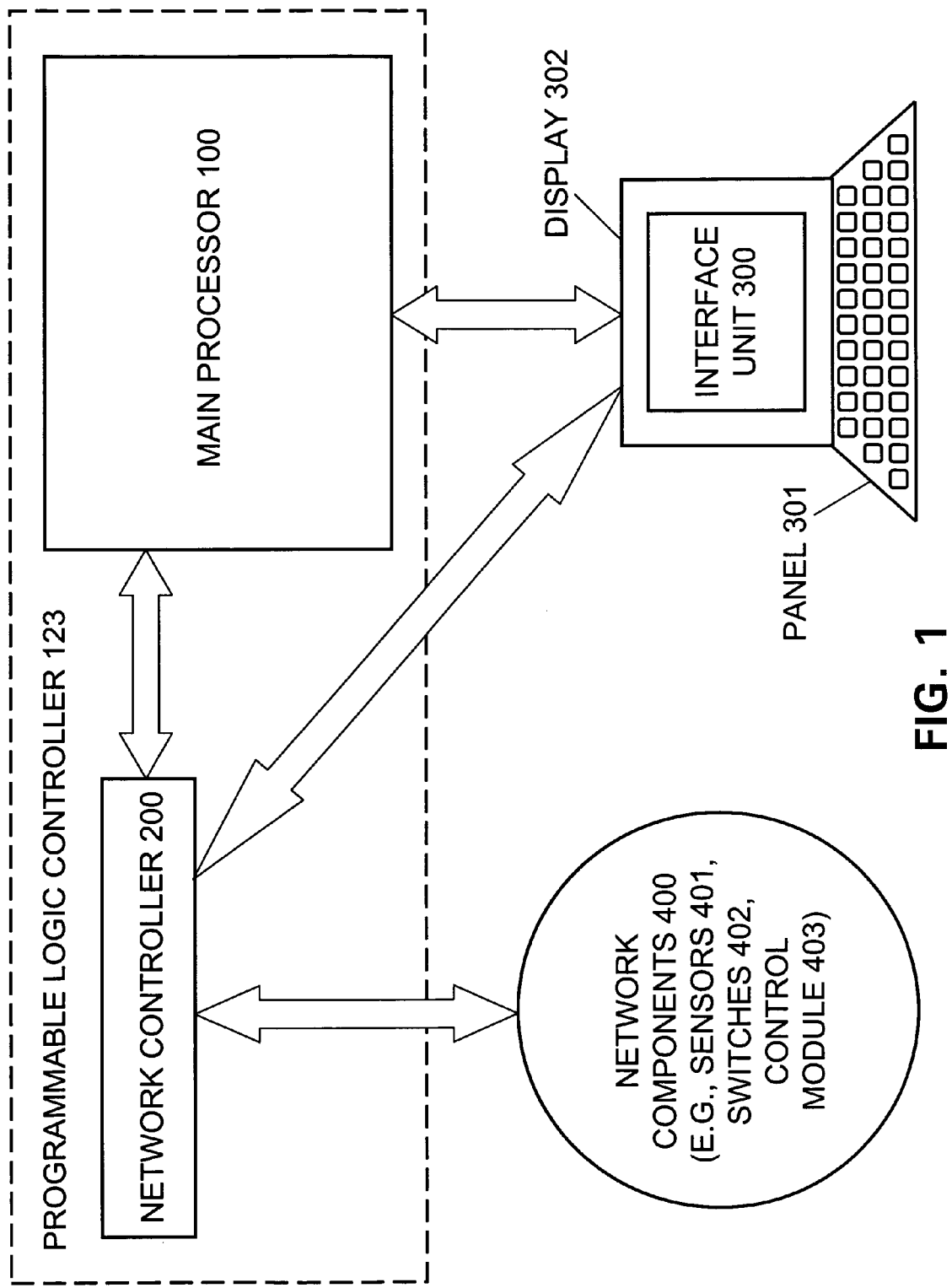
FIG. 1 is a simplified schematic illustrating the basic system components of a typical embodiment of a vertical package conveyance control system in accordance with the present invention.

Referring now to the figures, the present invention's algorithmic VPC control system includes a main processor 100, a network controller 200, a human-to-machine interface unit 300 and various local intelligent network devices 400. Interface unit 300, a station for human interaction, includes an operator's panel 301 and a display 302. Included among the intelligent devices 400 are sensors 401, switches 402 and a controller (local controller mechanism) 403. As diagrammatically represented in FIG. 1, there are four major, interconnected, functional components of the overall inventive VPC control system, viz., (i) the main processor 100 system component, (ii) the network controller 200 system component, (iii) the interface unit 300 system component, and (iv) the network devices 400 system component. Controller 200 is interconnected with the various network devices 400, which are local network components.

According to typical inventive practice, the processor 100 system component and the controller 200 system component are embodied as integrated processor-controller machinery such as including or included by a programmable logic controller (PLC) 123. The network devices 400 separately or individually feed into a controller 200 that is a computer card-like device that fits into a slot provided in the PLC 123 main structure and that permits various connections with devices 400 and other network components. According to the U.S. Navy's inventive prototype, controller 200 is a "DeviceNet" scanner device that is inserted into the major structural portion of PLC 123; all of the interconnections between the network components and controller 200 are via a DeviceNet network.

Figure 2:
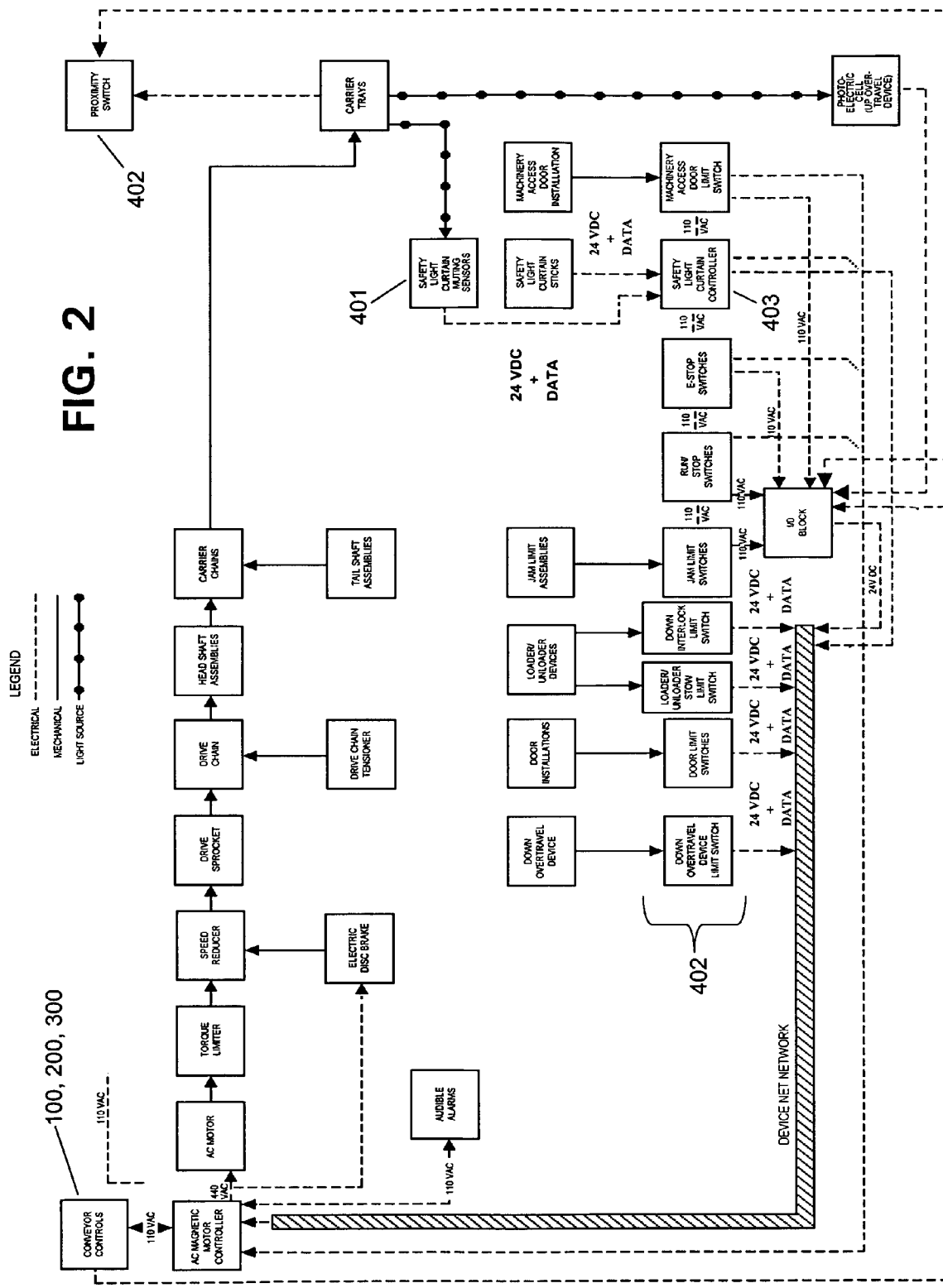
FIG. 2 is a block diagram of a prototype, being tested by the U.S. Navy, of a vertical package conveyance control system in accordance with the present invention, particularly illustrating various physical components and various electrical and mechanical connections therebetween.

The system block diagram of FIG. 2 provides a broad overview of the electrical and mechanical aspects of the present invention's conveyor control system. Illustrated are the mechanical and electrical interrelationships among the various physical components of the inventive control system. A solid line indicates a mechanical connection; a dashed line indicates an electrical connection. The present invention's system control station includes processor 100, controller 200 and interface 300. Several intelligent devices 400 are utilized, including the following: proximity switch 402; down overtravel device limit switch 402; door limit switches 402; loader/unloader stow limit switch 402; down interlock limit switch 402; jam limit switches 402; run stop ("run/stop") switches 402; emergency stop ("e-stop") switches 402; safety light curtain muting sensors 401; safety light curtain controller 403; machinery access door limit switch 402.

At least one intelligent device 400 is causative of the cessation of the vertical package conveyor. The present invention's jam limit switches 402 can involve a tripwire design. The safety light curtains implemented by the present invention can utilize known technology for protecting people from hazardous areas such as machinery complexes or elevator doorways (e.g., elevator doors that are closing). For instance, a light curtain apparatus can project many invisible infrared light beams (e.g., in grid-like fashion) defining a geometric plane that demarcates a boundary between permissible and impermissible presence; the light curtain is instantaneously activated when a person or object (even a small object) intercepts any of the beams.

Figure 3:
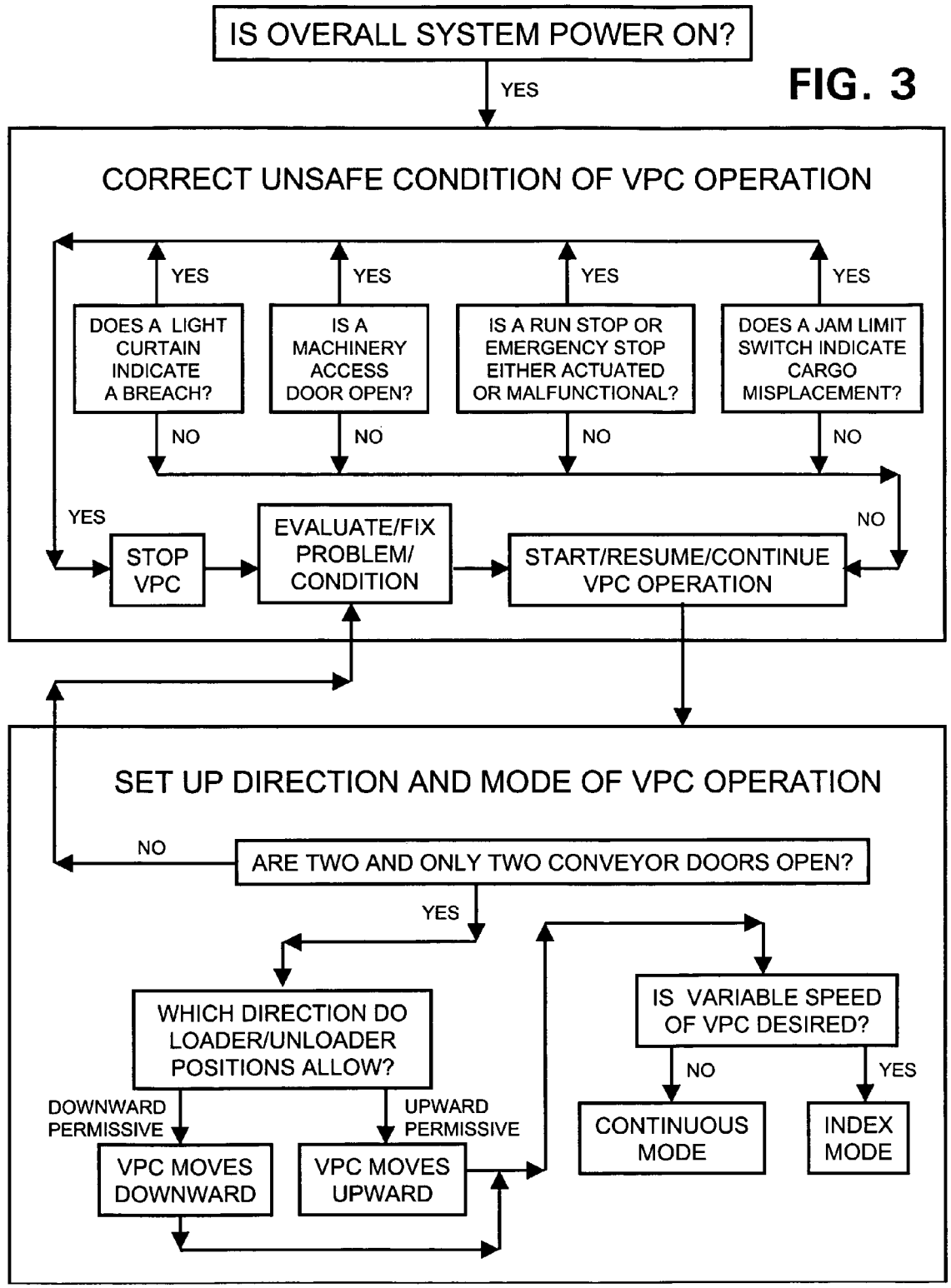
FIG. 3 is a simplified flowchart illustrating the basic control logic of a typical embodiment of a vertical package conveyance control system in accordance with the present invention.

As shown in FIG. 3, the controlling by processor 100 is effected in an essentially ongoing process (while the overall system power is on) in two aspects or phases of VPC operation, viz., (I) the safety of VPC operation and (II) the vertical direction and variability mode of VPC operation. Processor 100 monitors whether an unsafe condition exists in the operation of the conveyor, and stops (ceases operation of) the conveyor upon the discovery by processor 100 of the existence of such an unsafe condition. According to many preferred inventive embodiments such as the U.S. Navy's inventive prototype, processor 100 monitors conveyor operation for the occurrence of several conditions indicative of safety deficiency, viz.: a breach of a light curtain; the open state of a machinery access door (e.g., a machinery room door adjacent to the conveyor); the inoperability of a run stop button (e.g., push button); the inoperability of an emergency stop button (e.g., push button); the activation by a person of a run/stop button (e.g., push button); the activation by a person of an emergency stop button (e.g., push button); the misplacement of cargo with respect to the conveyor. Upon the occurrence of any of these safety-threatening conditions, processor 100 causes the conveyor to cease operation, thereby permitting human intervention to fix the problem and to subsequently re-start the conveyor. It is noted that either a run stop button or an emergency stop button may be humanly actuated due to a humanly perceived exigency.

In addition, processor 100 governs the direction of operation of the conveyor in terms of upward conveyor movement versus downward conveyor movement. Further, processor 100 governs the "mode" of operation of the conveyor in terms of variable conveyor speed versus invariable (constant) conveyor speed. According to the U.S. Navy's inventive prototype, a condition precedent to normal operation is that exactly two conveyor doors (e.g., one top door and one other door) be open. If fewer or greater than two conveyor doors are open, human intervention is needed to ensure the openness of two doors only and to then re-start the conveyor. The orientations of the loader/unloader trays relate to the selection of the vertical direction (upward or downward) in which the conveyor moves. The speed mode can be either "continuous" mode (wherein the conveyor moves at a constant speed) or "index" mode (wherein the conveyor can be controlled so as to move at variable speeds). The present invention thus advantageously affords the option of varying conveyor speeds—an option that is less feasibly implemented in a relay-type VPC control system.

Processor 100, controller 200 and interface unit 300, which communicate with each other, each have software installed therein (resident in its memory). Processor 100 contains in its memory the present invention's main processor source code, such as that which is exemplified by the electronic document entitled "conveyormainprocessorcode.txt," set forth herein in the computer program listing appendix. Network controller 200 (a "DeviceNet" scanner, according to the U.S. Navy prototype) contains in its memory the present invention's network controller source code, such as that which is exemplified by the electronic document entitled "conveyornetworkcontrollercode.txt," also set forth herein in the computer program listing appendix. Interface unit 300 contains in its memory the present invention's human interface source code, such as that which is exemplified by the electronic documents entitled "conveyorinterfaceunitcode.txt," and "conveyorinterfaceunitcode(pictorial).doc (which includes inventive screen portrayals), further set forth herein in the computer program listing appendix.

Figure 4:
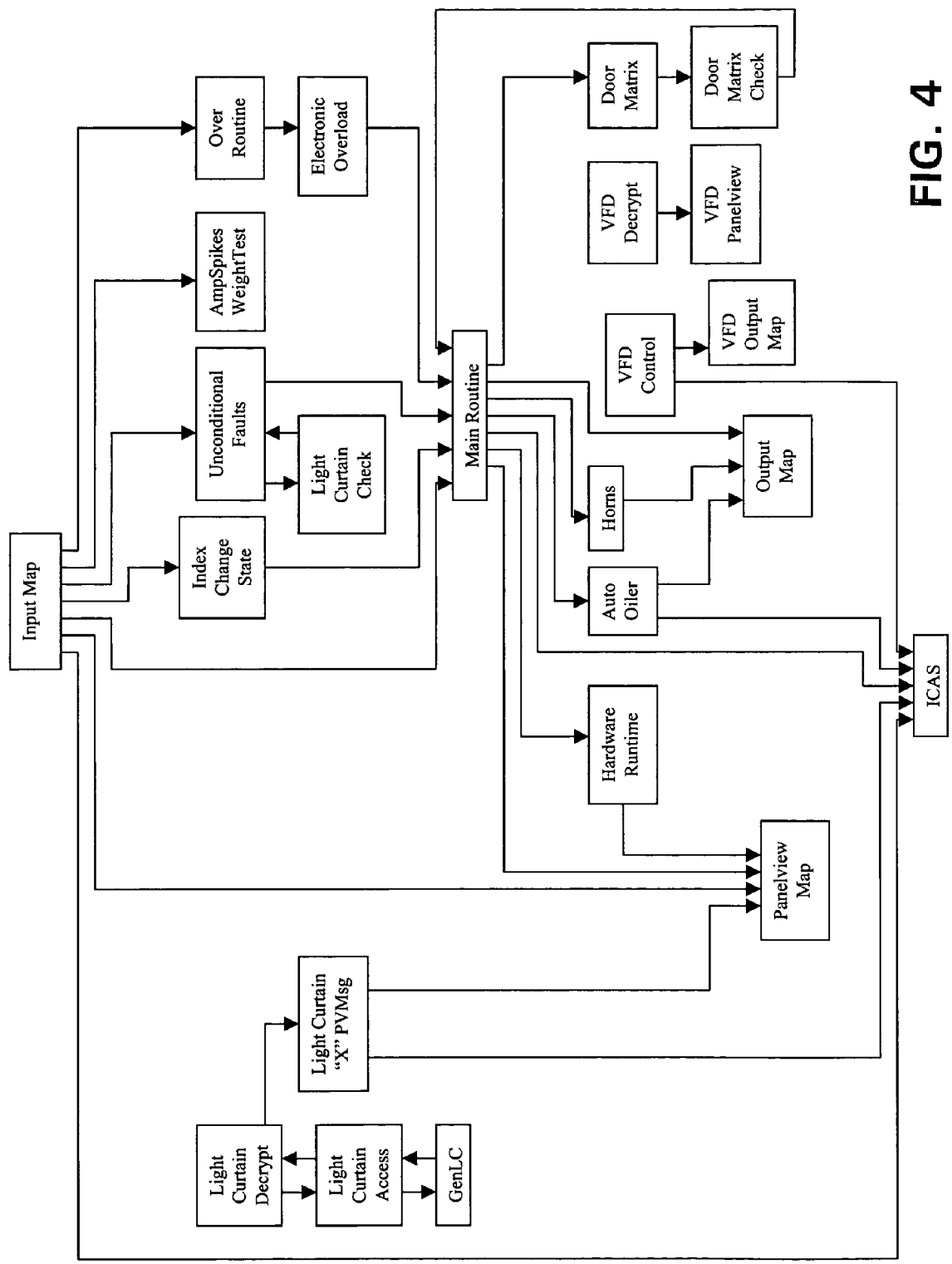
FIG. 4 is a block diagram of the programmable logic controller (PLC) ladder logic of the inventive algorithmic prototype corresponding to the inventive control system prototype shown in FIG. 2.
Figure 7:
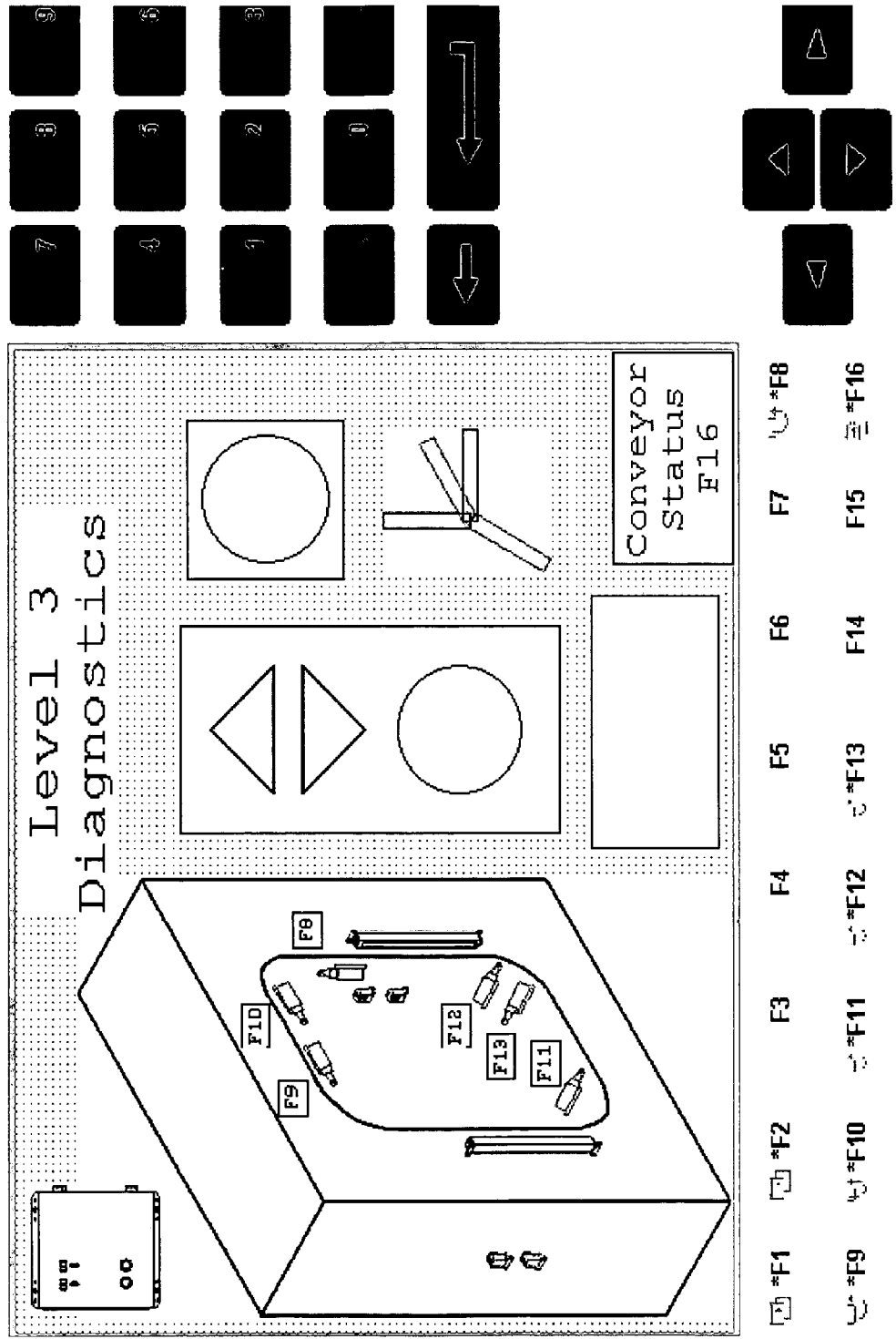
Figure 8:
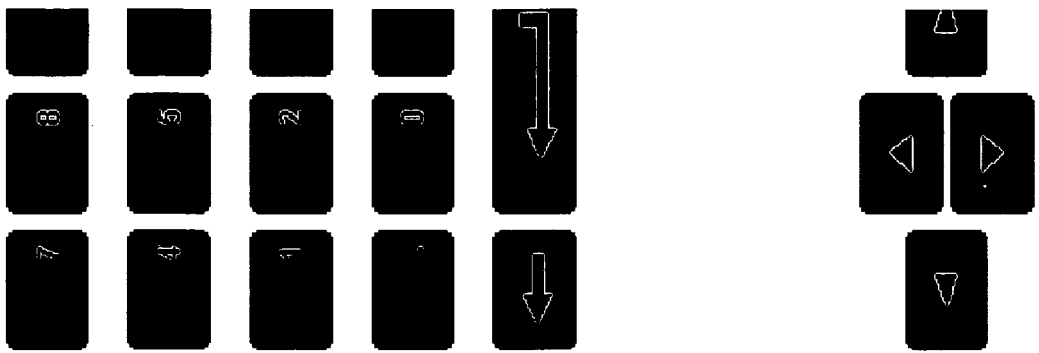
Figure 9:
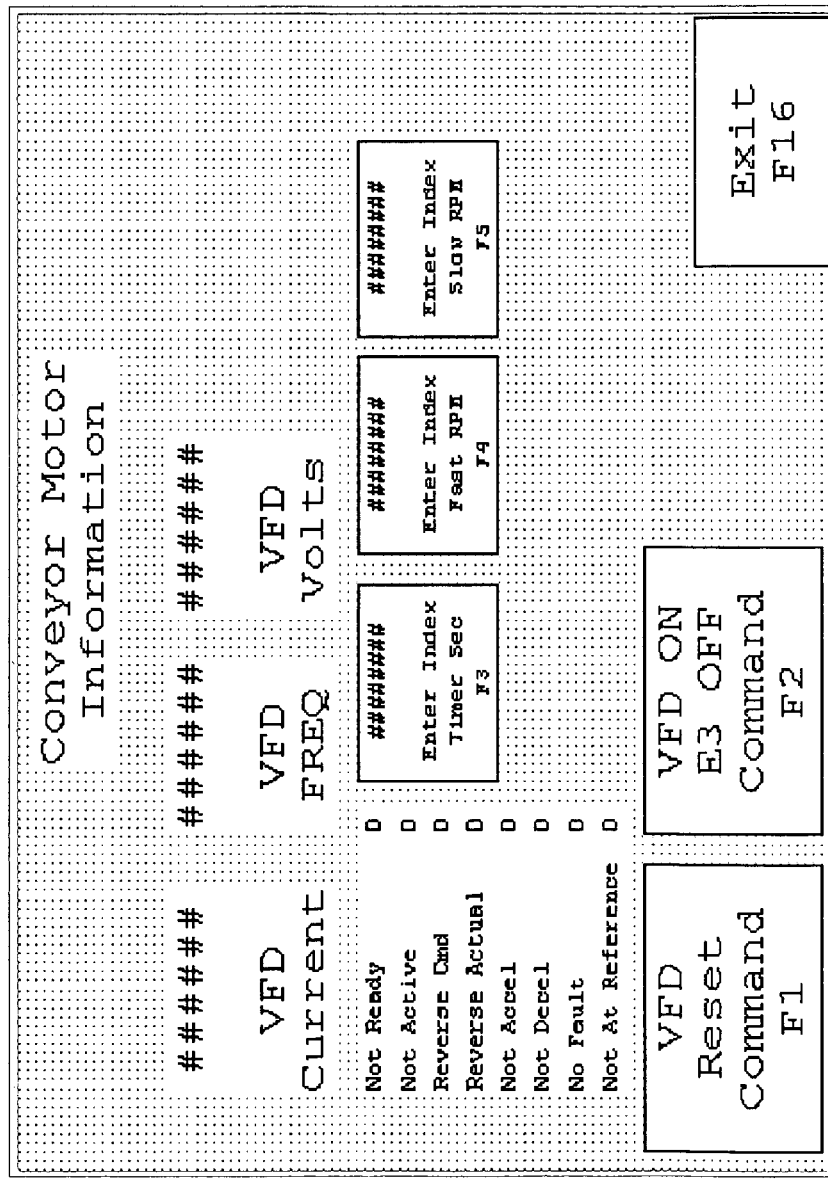
Figure 10:
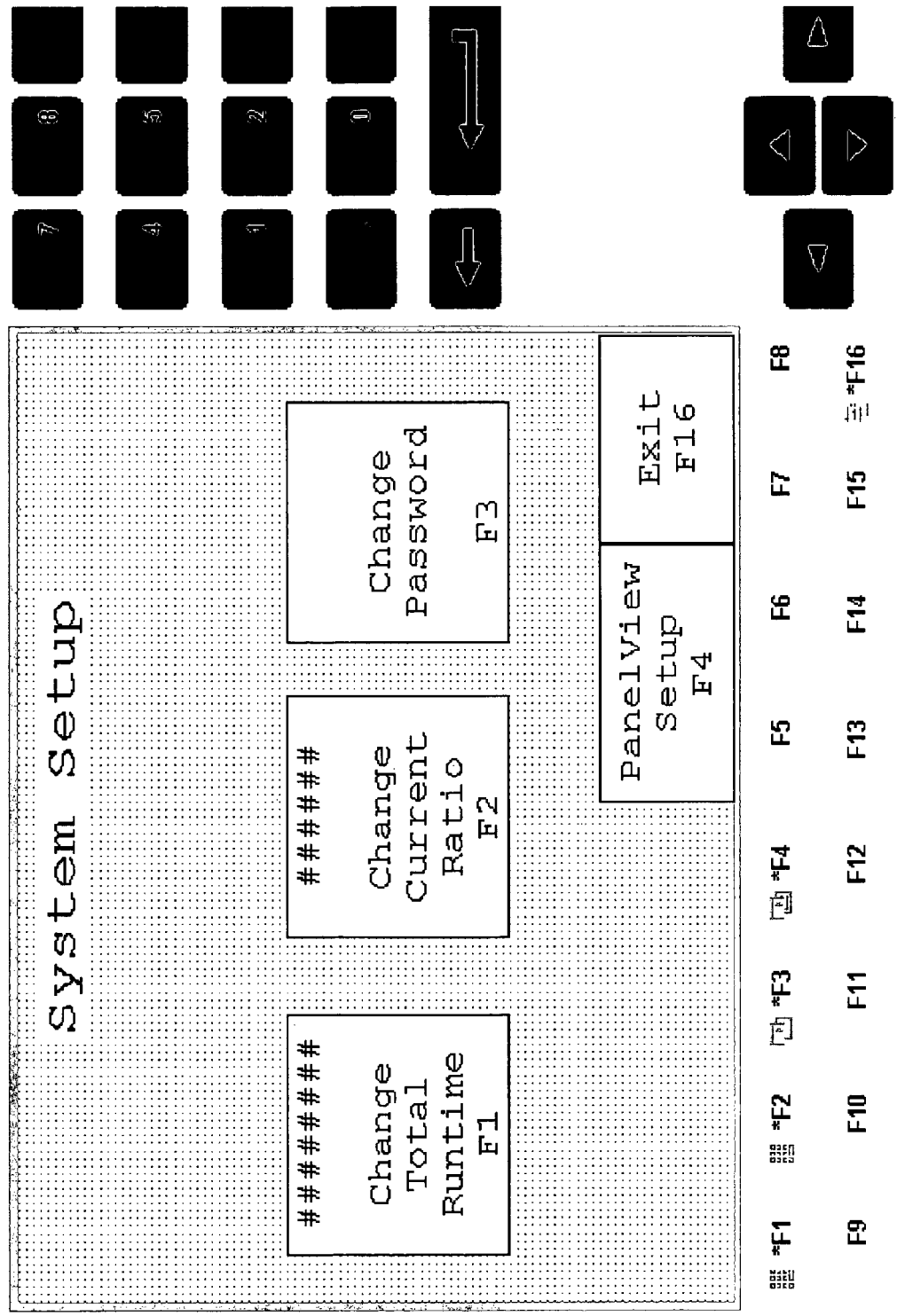

Main processor 100, in combination with the main processor code installed therein, is the primary decision-maker of the inventive VPC control system. The programmable logic controller (PLC) ladder logic block diagram of FIG. 4 diagrammatically represents the inventive embodiment of main processor 100 source code that is electronically contained in the computer program listing appendix of this disclosure as the document entitled "conveyormainprocessorcode.txt." The tabular representation of FIG. 5A through FIG. 5G describes various routines that are illustrated in FIG. 4 and included in the "conveyormainprocessorcode.txt" source code embodiment. The processor 100 code is executable on processor 100 so that a data representation for access by the processor code is storable in the memory of processor 100. The data representation is capable of being generated by processor 100 so that processor 100 is capable of controlling the operation of the vertical package conveyor. In particular, processor 100 regulates, in an essentially ongoing manner, the safety condition of the vertical package conveyor.

Unlike the algorithmic main processor 100 source code and the algorithmic interface 300 source code, the network controller 200 source code is not, strictly speaking, algorithmic in nature. The controller 200 code defines the network makeup, including the addressing and types of all of the devices 400 on the network, the speed of the network, and all of the input/output (I/O) mapping. The controller 200 code routes all of the I/O information to distinct locations in the memory of controller 200 so that referencing by the main processor 100 and the interface unit 300 can take place. Some code resident within processor 100 and some code resident within interface 300 are set up such that they will look to those specific memory locations to obtain the proper information needed for assimilation and display of information by interface unit 300. The embodiment of controller 200 code entitled "conveyornetworkcontrollercode.txt," disclosed herein as an electronic document in the computer program listing appendix, pertains to operation of a seven-level VPC system. In the light of the instant disclosure, the ordinarily skilled artisan will be capable of practicing the present invention for any number of VPC levels.

As shown in FIG. 6 through FIG. 12, interface unit 300 is informative and facilitative of human interaction, both manual and visual. Interface unit 300 provides status information, error information and troubleshooting information to the operation and maintenance personnel who manipulate panel 301 and view display 302. The interface 300 code defines numerous items relating to the various visual indications appearing on its display 302, including the physical look and layout of the various informational screens, the colors that are used, the error messages, the troubleshooting aids, and the parts information. FIG. 6 through FIG. 12 depict the following screens, respectively: conveyor status; level diagnostic; diagnostic; system setup; motor information; alarm history; light curtain identification ("ID"). An example of color cueing that can be manifested is such screens is portrayed by FIG. 6, which indicates three permissive run modes, viz., "up continuous," "up index" and "down continuous"; the three circles (encompassed by a rectangle) situated next to these three permissive run mode indications each turn either red (for "off") or green (for "on") in color.

Processor 100 receives all of the inputs from the various network intelligent device components 400 within the inventive VPC control system. The inventive algorithm that is installed in processor 100 then decides, from those inputs, if the conveyor is safe to operate. If the processor 100 algorithm determines that the conveyor can be safely operated, then the processor 100 algorithm analyzes the position and status of conveyor doors and various other components to determine what direction and mode of operation the conveyor is set up to run in. If the processor 100 algorithm determines that the conveyor is set up for a certain mode of operation, processor 100 awaits a start input. When the start input is received, processor 100 then sends out start and speed commands for motor control of the conveyor.

All three inventive source codes—viz., the processor 100 code, the controller 200 code and the interface 300 code—work and interface with each other to be informative about and regulatory of the VPC. According to typical inventive practice, these three pieces of source code are necessary components to achieve safe control and provide display of status and error information. All communication between and among the three source codes is carried out over the inventive network that is associated with the VPC. Main processor 100 processes the input information and then sends out the proper output information to the proper components in the network. This output information could include, for instance: a "start" command to the motor; and/or status information to interface unit 300; and/or error information to interface unit 300; and/or corresponding steps to take to correct errors so that operation of the conveyor can begin. While the conveyor is running, the transfer of data continues to determine if any conditions have changed that would require the conveyor to be stopped. Conveyor operation continues until the main processor 100 source code determines, based on the information that main processor 100 has received, that the conveyor motor should be stopped.

FIG. 4 shows a significant diagrammatic flow into "ICAS" (acronymous for the "Integrated Condition Assessment System"). As distinguished from a localized network (e.g., a DeviceNet network) that is specific to an individual conveyor, ICAS is a central, ship-wide network (e.g., an Ethernet network) that receives information from each of the localized, conveyor-associated networks. Within each localized inventive conveyor control system and network, the main processor 100 code assembles information that is sent out over the ship's ICAS network for data collection and trending. All of the important data is sent out over the ICAS network for monitoring and trending by an assessment system.

The present invention is not to be limited by the embodiments described or illustrated herein, which are given by way of example and not of limitation. Other embodiments of the present invention will be apparent to those skilled in the art from a consideration of this specification or practice of the invention disclosed herein. Various omissions, modifications and changes to the principles described herein may be made by one skilled in the art without departing from the true scope and spirit of the present invention, which is indicated by the following claims.

What is claimed is:

1. A system for use in association with a vertical package conveyor apparatus, said conveyor apparatus including a vertically movable chain and plural horizontal carrier trays attached to said chain and vertically separated from each other, operation of said conveyor apparatus being characterized by continuing vertical movement of said chain whereby said carrier trays move correspondingly with said vertical movement of said chain, the system comprising a processor-controller and plural electromechanical devices, said electromechanical devices being connected to said processor-controller and said conveyor apparatus, said processor-controller being capable of receiving and processing information provided by said electromechanical devices and being capable of regulating said operation of said conveyor apparatus, said regulation of said operation of said conveyor apparatus including monitoring whether an unsafe condition exists in said operation of said conveyor apparatus and further including ceasing said operation of said conveyor apparatus upon determining that said unsafe condition exists in the operation of said conveyor apparatus, said ceasing of said operation of said conveyor apparatus including ceasing of said vertical movement of said chain, said unsafe condition pertaining to the safety of humans in the vicinity of said conveyor apparatus, said electromechanical devices including at least one light curtain breach sensor and at least one light curtain muting sensor, said at least one light curtain breach sensor being for establishing, and sensing breaching of, at least one light curtain proximate said conveyor apparatus, said at least one light curtain muting sensor being for sensing when at least one said carrier tray is in a position in which said breaching of at least one said light curtain is not unsafe;

wherein said unsafe condition is determined by said processor-controller to exist with respect to at least one said light curtain when said at least one light curtain breach sensor provides some said information that is indicative of said breaching of at least one said light curtain, and when said at least one light curtain muting sensor does not provide any said information that is indicative of said position of at least one said carrier tray in which said breaching of at least one said light curtain is not unsafe; and wherein said unsafe condition is determined by said processor-controller not to exist with respect to at least one said light curtain when said at least one light curtain muting sensor provides some said information that is indicative of said position of at least one said carrier tray in which said breaching of at least one said light curtain is not unsafe.

2. The system according to claim 1, said regulation of said operation of said conveyor apparatus further including, after said ceasing of said operation of said conveyor apparatus, at least one of the following:

correcting said unsafe condition that exists;

re-initiating the operation of said conveyor apparatus.

3. The system according to claim 1, said regulation of said operation of said conveyor apparatus further including establishing at least one of the following:

the direction, in terms of upward versus downward, of said operation of said conveyor apparatus;

the mode, in terms of variability versus invariability of speed, of said operation of said conveyor apparatus.

4. The system according to claim 3, wherein:
the system further comprises includes an interface unit that permits human interaction with said processor-controller;
said monitoring of whether an unsafe condition exists including identifying, for human understanding via said interface unit, at least one of the following:
said unsafe condition that exists;
the cause of said unsafe condition that exists;
said regulation of the operation of said conveyor apparatus further includes, after said ceasing of said operation of said conveyor apparatus, at least one of the following:
correcting said unsafe condition that exists;
re-initiating said operation of said conveyor apparatus.

5. The system according to claim 4, wherein:
said processor-controller, said interface unit and said electromechanical devices are used, at least, for said monitoring of whether an unsafe condition exists;
human action is used, at least, for said correcting of said unsafe condition that exists; and
human action is used, at least, for said re-initiating said operation of said conveyor apparatus.

6. The system according to claim 5, said regulation further including establishing at least one of the following:
the direction, in terms of upward versus downward, of said operation of said conveyor apparatus;
the mode, in terms of variability versus constancy of speed, of said operation of said conveyor apparatus.

7. The system according to claim 6, wherein said processor-controller includes a programmable logic controller.

8. The system according to claim 1 wherein said unsafe condition is determined by said processor-controller to exist upon the realization of at least one of the following:
the providing of some information by said at least one door limit switch that a machinery access door in the vicinity of said conveyor apparatus is open;
the providing of some information by said at least one stop switch that a stopping function of said conveyor apparatus is malfunctional;
the providing of some information by said at least one stop switch that a stopping function of said conveyor apparatus is humanly actuated due to a humanly perceived exigency;
the providing of some information by said at least one jam limit switch that a package is misplaced relative to said conveyor apparatus.

9. The system according to claim 1, wherein said conveyor apparatus is characterized by plural levels, said carrier trays moving vertically so as to intermittently pass through each said level, each said level having associated therewith:
at least one said light curtain breach sensor for establishing at least one light curtain proximate said conveyor apparatus at said level; and
at least one said light curtain muting sensor for sensing when at least one said carrier tray is in a position in which said breaching of at least one said light curtain is not unsafe at said level.

10. A method for controlling a vertical package conveyor so as to enhance the safety of humans in the vicinity of said vertical package conveyor, said vertical package conveyor being of the kind including a vertically movable chain and plural horizontal carrier trays joined to said chain and vertically spaced apart from each other so as to vertically move concomitantly with said chain, the regular functioning of said vertical package conveyor including uninterrupted vertical movement of said chain and said carrier trays, the method comprising:

electrically connecting a plurality of electronic devices to said vertical package conveyor, said electronic devices including plural light curtain breach sensing devices and plural light curtain muting sensing devices, each said light curtain breach sensing device establishing a light curtain proximate said vertical package conveyor and detecting breaching of said light curtain, each said light curtain being encountered by the vertically moving said carrier trays one said carrier tray at a time, each said light curtain muting sensing device being associated with a said light curtain, establishing a safe zone relative to said light curtain with which said light curtain muting sensing device is associated, and detecting situation of a said carrier tray in said safe zone relative to said light curtain with which said light curtain muting sensing device is associated; and
electrically connecting a programmable logic controller to said electronic devices, said programmable logic controller being programmed for causing said vertical package conveyor to stop said regular functioning of said vertical package conveyor upon the finding of an unsafe condition, said stoppage of said regular functioning of said vertical package conveyor including interruption of said vertical movement of said chain and said carrier trays, wherein:
said unsafe condition is deemed not to exist with respect to said light curtain with which said light curtain muting sensing device is associated if said light curtain muting sensing device detects situation of a said carrier tray in said safe zone relative to said light curtain with which said light curtain muting sensing device is associated; and
said unsafe condition is deemed to exist with respect to said light curtain with which said light curtain muting sensing device is associated if: said light curtain breach sensing device establishing said light curtain with which said light curtain muting sensing device is associated detects breaching of said light curtain with which said light curtain muting sensing device is associated; and said light curtain muting sensing device does not detect situation of a said carrier tray in said safe zone relative to said light curtain with which said light curtain muting sensing device is associated.

11. The method recited in claim 10, the method further comprising:
connecting an interface unit to said programmable logic controller; and
interacting with said programmable logic controller via said interface unit.

12. The method recited in claim 10, the method further comprising:
eliminating said unsafe condition subsequent to said stoppage of said regular functioning of said vertical package conveyor; and
resuming regular functioning of said vertical package conveyor subsequent to said eliminating of said unsafe condition.

13. The method recited in claim 10, the method further comprising at least one of:
regulating the upward versus downward direction of said vertical movement of said chain and said trays;
regulating the variable versus invariable speed mode of said vertical movement of said chain and said carrier trays.

14. The method recited in claim 10, wherein said unsafe condition is also deemed to exist with respect to any one of the following:

an open machinery access door;

a defectively caused said stoppage of said regular functioning of said vertical package conveyor;

a misplaced package on said vertical package conveyor.

15. The method recited in claim 14, wherein:

said electronic devices are each indicative as to at least one said unsafe condition; and said electronic devices are selected from the group consisting of sensing device, switching device, and control device.

16. The method recited in claim 10, wherein said connecting of said electronic devices to said vertical package conveyor includes pairing a said light curtain breach sensing device and a said light curtain muting sensing device at each of plural levels, said vertical package conveyor being characterized by said levels, said carrier trays moving vertically so as to intermittently pass through each said level.

17. A computer program product for controlling a vertical package conveyor so as to enhance the safety of humans in the vicinity of said vertical package conveyor, said vertical package conveyor being of the kind including a vertically movable chain and plural horizontal carrier trays joined to said chain and vertically spaced apart from each other so as to vertically move concomitantly with said chain, the regular functioning of said vertical package conveyor including uninterrupted vertical movement of said chain and said carrier trays, the computer program product comprising a computer-readable storage medium having computer-readable program code portions stored therein, the computer-readable program code portions including:

a first executable computer-readable program code portion for processing electrical signals received from plural electronic devices electrically connected to said vertical package conveyor, said electronic devices including plural light curtain breach sensing devices and plural light curtain muting sensing devices, each said light curtain breach sensing device establishing a light curtain proximate said vertical package conveyor and transmitting said electrical signals indicative of detection of breaching of said light curtain, each said light curtain being encountered by the vertically moving said carrier trays one said carrier tray at a time, each said light curtain muting sensing device being associated with a said light curtain, establishing a safe zone relative to said light curtain with which said light curtain muting sensing device is associated, and transmitting said electrical signals indicative of detection of situation of a said carrier tray in said safe zone relative to said light curtain with which said light curtain muting sensing device is associated; and a second executable computer-readable program code portion for stopping said regular functioning of said vertical package conveyor upon the finding of an unsafe condition, said stoppage of said functioning of said vertical package conveyor including interruption of said vertical movement of said chain and said carrier trays, wherein:

said unsafe condition is deemed not to exist with respect to said light curtain with which said light curtain muting sensing device is associated if said light curtain muting sensing device detects situation of a said carrier tray in said safe zone relative to said light curtain with which said light curtain muting sensing device is associated; and said unsafe condition is deemed to exist with respect to said light curtain with which said light curtain muting sensing device is associated if: said light curtain breach sensing device establishing said light curtain with which said light curtain muting sensing device is associated detects breaching of said light curtain with which said light curtain muting sensing device is associated; and said light curtain muting sensing device does not detect situation of a said carrier tray in said safe zone relative to said light curtain with which said light curtain muting sensing device is associated.

18. The computer program product defined in claim 17, said executable computer-readable program code portions further including:

a third executable computer-readable program code portion for governing up-versus-down direction of said vertical movement of said chain and said carrier trays;

a fourth executable computer-readable program code portion for governing variable-versus-invariable speed of said vertical movement of said chain and said carrier trays.

19. The computer program product defined in claim 17, wherein said unsafe condition is also deemed to exist with respect to any one of the following:

an open machinery access door;

a defectively caused said stoppage of said regular functioning of said vertical package conveyor;

a misplaced package on said vertical package conveyor.

20. The computer program product defined in claim 17, wherein:

said vertical package conveyor are characterized by plural levels;

a said light curtain breach sensing device and a said light curtain muting sensing device are paired at each said levels;

said carrier trays move vertically so as to intermittently pass through each said level.

* * * * *